(12) United States Patent
Li

(10) Patent No.: US 11,173,469 B2
(45) Date of Patent: Nov. 16, 2021

(54) EFFICIENT MASS-TRANSFER SEPARATION BULK FILLER STRUCTURE

(71) Applicant: Beijing University of Chemical Technology, Beijing (CN)

(72) Inventor: Qunsheng Li, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 48 days.

(21) Appl. No.: 16/903,414

(22) Filed: Jun. 17, 2020

(65) Prior Publication Data
US 2020/0306721 A1 Oct. 1, 2020

(30) Foreign Application Priority Data

May 29, 2020 (CN) .......................... 202010476406.2

(51) Int. Cl.
*B01J 19/30* (2006.01)
*B01J 19/32* (2006.01)

(52) U.S. Cl.
CPC ........ *B01J 19/32* (2013.01); *B01J 2219/3221* (2013.01); *B01J 2219/32237* (2013.01)

(58) Field of Classification Search
CPC .. B01J 19/30; B01J 19/32; B01J 2219/30223; B01J 2219/30226; B01J 2219/30261; B01J 2219/30265; B01J 2219/30284; B01J 2219/30483; B01J 2219/31; B01J 2219/3221; B01J 2219/32237
USPC ...................................... 261/94, 95, DIG. 72
See application file for complete search history.

(56) References Cited

U.S. PATENT DOCUMENTS

| | | | | |
|---|---|---|---|---|
| 1,360,928 A | * | 11/1920 | Goodwin | B01J 19/30 261/95 |
| 2,408,164 A | * | 9/1946 | Foster | B01J 27/06 502/226 |
| 4,985,182 A | * | 1/1991 | Basse | B01J 19/30 261/94 |
| 5,168,090 A | * | 12/1992 | Ebner | B01J 19/30 502/209 |
| 5,330,958 A | * | 7/1994 | Viola | B01J 19/30 502/316 |

(Continued)

FOREIGN PATENT DOCUMENTS

| | | | |
|---|---|---|---|
| DE | 102 31 217 B4 | * | 12/2005 |
| DE | 102004062915 A1 | * | 3/2006 |
| WO | WO 2013/151889 A1 | * | 10/2013 |

*Primary Examiner* — Charles S Bushey

(57) ABSTRACT

The present invention discloses an efficient mass-transfer separation bulk filler structure, which includes a bulk filler body with closely-fit multilayer structures, wherein an annular wall surface of the bulk, filler body has a corrugated angle group. A lower portion of the bulk filler body is of a bell-mouth shape. Three passages with a same sectional area are formed inside the bulk filler body. The present invention has the characteristics of small pressure drop, large specific surface area, low liquid holdup and large void ratio. The annular wall surface is provided with the corrugated angle group to increase the disturbance and reduce a double-membrane thickness of vapor and liquid phase mass-transfer resistance, thereby improving the mass-transfer coefficient and separation efficiency. Meanwhile, by adopting the bell-mouth shape, the stability and natural stacking regularity of the bulk filler can be improved.

7 Claims, 1 Drawing Sheet

(56) References Cited

U.S. PATENT DOCUMENTS

| | | | | |
|---|---|---|---|---|
| 6,117,812 A | * | 9/2000 | Gao | B01D 3/009 |
| | | | | 502/155 |
| 6,447,675 B1 | * | 9/2002 | James | C05F 7/00 |
| | | | | 210/150 |
| 7,468,134 B2 | * | 12/2008 | Hoang | A01K 63/045 |
| | | | | 210/150 |
| 2008/0181054 A1 | * | 7/2008 | Kojima | B01J 19/30 |
| | | | | 366/336 |

* cited by examiner

EFFICIENT MASS-TRANSFER SEPARATION BULK FILLER STRUCTURE

TECHNICAL FIELD

The present invention relates to the technical field of chemical separation processes and equipment, and more particularly relates to an efficient mass-transfer separation bulk filler structure.

BACKGROUND

In the petrochemical, chemical pharmaceutical and fine chemical industries, rectifying tower equipment accounts for more than 60% of the separation equipment. In a rectification process, it is necessary to calculate the size of the rectifying tower equipment according to the requirements such as processing capacity, physical properties, product purity, etc. When the capacity to be processed is small, the designed rectifying tower always has a small tower diameter. By adopting a tower plate or regular filler as a core internal component of the rectification, the production and installation are extremely difficult, and the cost is increased sharply. Bulk fillers are required to solve the above, problem.

However, the existing bulk filler has the problems of large pressure drop, small flux, low mass-transfer efficiency, etc., which leads to that the separation requirements can be met only by increasing the tower height, thereby causing the excessive height of the rectifying tower, increasing the manufacturing and installation difficulty, and also resulting in difficulty in meeting the stability requirement of the equipment.

Therefore, to provide an efficient mass-transfer separation bulk filler structure with small pressure drop and large specific surface area is a problem to be urgently solved by those skilled in the art.

SUMMARY

In view of this, the present invention provides an efficient mass-transfer separation bulk filler structure, which has the characteristics of small pressure drop, large specific surface area, low liquid holdup and large void ratio.

To realize the above purpose, the present invention adopts the following, technical solutions:

An efficient mass-transfer separation bulk filler structure comprises a bulk filler body with closely-fit multilayer structures.

An annular wall surface of the bulk filler body has a corrugated angle group.

A lower portion of the bulk filler body is of a bell-mouth shape.

Three passages with a same sectional area are formed inside the bulk filler body.

Further, the bulk filler body is formed by coiling a silk screen or a sheet.

Further, a thickness of the sheet is less than or equal to 5 mm.

Further, a diameter of a wire of the silk screen is less than or equal to 3 mm, and an intersected angle formed among the wires of the silk screen is 45°-90°.

Further, the corrugated angle group comprises a plurality of first corrugated angles and a plurality of second corrugated angles which are alternately arranged on the annular wall surface. An angle of the first corrugated angles is greater than or less than the angle of the second corrugated angles.

Further, the angles of the first corrugated angles and the second corrugated angles are 60°-120°.

Further, an area ratio of the upper portion of the bulk filler body to the bell-mouth-shaped lower portion is 1.1:3.

By adopting the above solutions, the present invention has the beneficial effects:

1) The annular wall surface is provided with the corrugated angle group, i.e. the corrugated angles of different angles which are alternately arranged to increase the disturbance and reduce the double-membrane thickness of the vapor and liquid phase mass-transfer resistance, thereby improving the mass-transfer coefficient and the separation efficiency.

2) By adopting the bell-mouth shape, the stability and natural stacking regularity of the bulk filler can be improved.

3) By averaging the area of the internal passages, the flow smoothness of the gas and liquid can be ensured.

4) The intersected angle among the wires of the silk screen can be designed and selected to meet the flux requirement.

5) By designing the multilayer structure, the multilayer structures are closely fit through the toughness, so that not, only the gas-liquid mass-transfer area can be increased, but also the strength of the bulk filler can be ensured, and the service life can be prolonged.

BRIEF DESCRIPTION OF THE DRAWINGS

To more clearly describe the technical solution in the embodiments of the present invention or in the prior art, the drawings required to be, used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the figures: 1-bulk filler body, 2-corrugated angle group, 11-passage, 21-first corrugated angle, and 22-second corrugated corner.

DETAILED DESCRIPTION

The technical solution in the embodiments of the present invention will be clearly and fully described below in combination with the drawings in the embodiments of the present invention. Apparently, the described embodiments are merely part, of the embodiments of the present invention, not all of the embodiments. Based on the embodiments in the present invention, all other embodiments obtained by those ordinary skilled in the art without contributing creative labor will belong to the protection scope of the present invention.

Figure 1:
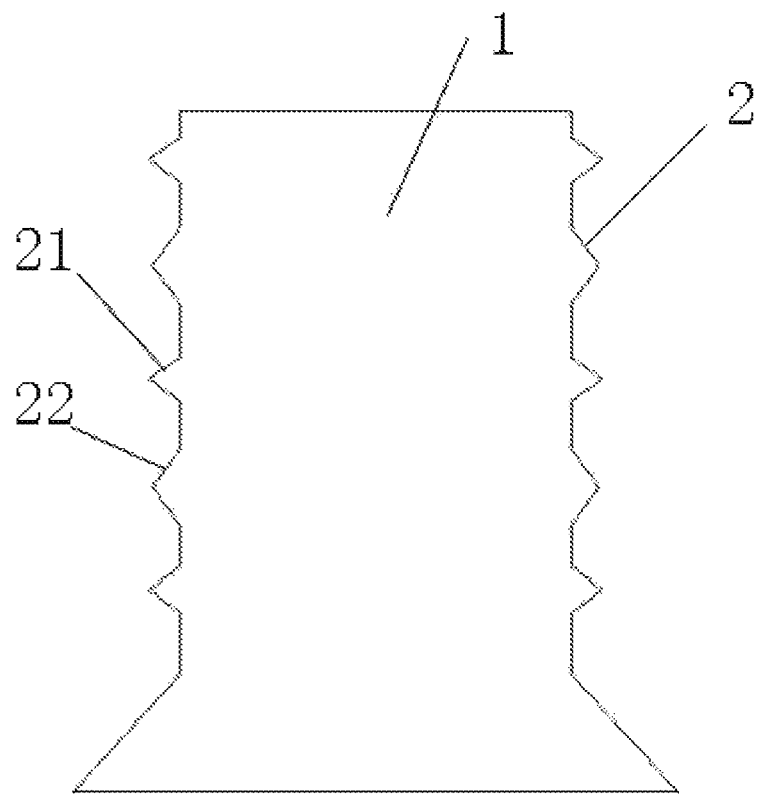
FIG. 1 is a front-view structural schematic diagram of an efficient mass-transfer separation bulk filler structure provided by the present invention.
Figure 2:
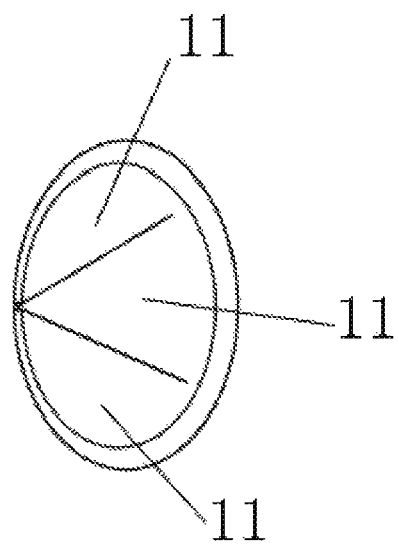
FIG. 2 is a top-view structural schematic diagram of an efficient mass-transfer separation bulk filler structure provided by the present invention.

As shown in FIG. 1 and FIG. 2, embodiments of the present invention disclose an efficient mass-transfer separation bulk filler structure, which includes a bulk filler body 1 with closely-fit multilayer structures. An annular wall surface of the bulk filler body 1 has a corrugated angle group 2. A lower portion of the bulk filler body 1 is of a bell-mouth shape. Three passages 11 with a same sectional area are formed inside the bulk filler body 1. The present invention has the characteristics of small pressure drop, large specific surface area, low liquid holdup and large void ratio. The annular wall surface is provided with the corrugated corner group 2 to increase the disturbance and reduce a double-membrane thickness of vapor and liquid phase mass-transfer resistance, thereby improving the mass-transfer coefficient and the separation efficiency. Meanwhile, by adopting the bell-mouth shape, the stability and natural stacking regularity of the bulk filler can be improved. Moreover, by averaging the area of the internal passages 11, the flow smoothness of the gas and liquid can be ensured.

Specifically, the bulk filler body 1 is formed by coiling a silk screen or a sheet.

Specifically, a thickness of the sheet is less than or equal to 5 mm.

Specifically, a diameter of a wire of the silk screen is less than or equal to 3 mm, and an intersected angle formed among the wires of the silk screen is 45°-90°.

Specifically, the corrugated angle group 2 includes a plurality of first corrugated angles 21 and a plurality of second corrugated angles 22 which are alternately arranged on the annular wall surface. An angle of the first corrugated angles 21 is greater than or less than the angle of the second corrugated angles 22.

Specifically, the angles of the first corrugated angles 21 and the second corrugated angles 22 are 60°-120°.

Specifically, an area ratio of the upper portion of the bulk filler body 1 to the bell-mouth-shaped lower portion is 1.1:3.

Example: bulk filler is replaced for experiment equipment of methanol and water in a laboratory. Small rectifying tower equipment with a diameter of 50 mm and a filler height of 1000 mm is used in the laboratory to carry out the separation experiment of the methanol and water.

Before the replacement, when a ceramic Rasching ring is used as the filler, a mixture of methanol and water with a mass fraction of 50% is used as feedstock, and a methanol product with the mass fraction of 90% can be obtained at the top of the tower. A same volume of the bulk filler of the present invention (the specification is 2 mm×2 mm) is used for the replacement and the same feeding state is also ensured, so that the methanol product with the mass fraction of 94% can be obtained at the top of the tower.

A tower kettle of the experiment equipment is heated in an electric heating way, and different electric energy consumptions are recorded by an instrument. Compared with the Rasching ring serving as the filler, the electric energy consumption can be reduced by 30% by adopting the bulk filler of the present invention.

Tests and industrial, applications show that the present invention has the characteristics of small pressure drop, large specific surface area, low liquid holdup, and large void ratio. At present, the present invention has already been applied to scores of rectifying towers in the industry, including vacuum distillation towers in oil refinery, hydrogen production workshops of polyamide fiber plants, synthetic ammonia decarbonization apparatuses, regeneration tower modification of chemical fertilizer plants, modification of rectifying towers and absorption towers in the production of acetic acid, and the modification of rectifying extraction towers of dewaxed oil phenol of the oil refinery. Through the key applications, great economic benefits can be brought to the enterprises.

Each embodiment in the description is described in a progressive way. The difference of each, embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. An efficient mass-transfer separation bulk filler structure, comprising a bulk filler body with closely-fit multilayer structures, wherein
an annular wall surface of the bulk filler body has a corrugated angle group;
a lower portion of the bulk filler body is of a bell-mouth shape;
three passages with a same sectional area are formed inside the bulk filler body.

2. The efficient mass-transfer separation bulk filler structure according to claim 1, wherein the bulk filler body is formed by coiling a silk screen or a sheet.

3. The efficient mass-transfer separation bulk filler structure according to claim 2, wherein a thickness of the sheet is less than or equal to 5 mm.

4. The efficient mass-transfer separation bulk filler structure according to claim 2, wherein a diameter of a wire of the silk screen is less than or equal to 3 mm, and an intersected angle formed among the wires of the silk screen is 45°-90°.

5. The efficient mass-transfer separation bulk filler structure according to claim 1, wherein the corrugated angle group comprises a plurality of first corrugated angles and a plurality of second corrugated angles which are alternately arranged on the annular wall surface; and an angle of the first corrugated angles is greater than or less than the angle of the second corrugated angles.

6. The efficient mass-transfer separation bulk filler structure according to claim 5, wherein the angles of the first corrugated angles and the second corrugated angles are 60°-120°.

7. The efficient mass-transfer separation bulk filler structure according to claim 1, wherein an area ratio of the upper portion of the bulk filler body to the bell-mouth-shaped lower portion is 1.1:3.

\* \* \* \* \*